Patented Jan. 3, 1950

2,493,486

UNITED STATES PATENT OFFICE 2,493,486

TALL OIL ESTERS

Sylvan Owen Greenlee, Louisville, Ky., assignor to Devoe & Raynolds Company, Inc., Louisville, Ky., a corporation of New York No Drawing. Application April 10, 1946,
Serial No. 661,061

4 Claims. (Cl. 260—18)

The invention relates to new synthetic drying compositions and more particularly to tall oil acid esters of high molecular weight resinous polyhydric alcohols.

The new drying compositions are valuable drying varnish compositions having improved properties, including improved resistance to alkali, water and chemicals, improved hardness and flexibility, improved drying properties, improved body, gloss and adhesion to surfaces, and other desirable properties as compared with tall esters of ordinary alcohols.

The new synthetic drying compositions of the present invention in which the high molecular weight resinous polymeric polyhydric alcohols are used and esterified with tall oil acids enable drying varnishes to be obtained from acids which would not give drying varnishes when esterified with glycerol, penta-erythritol and the like due to the low unsaturation present in the acids.

The new drying compositions enable films of acceptable flexibility to be obtained even though the oil portion of the resulting varnish is very low. Tall oil contains around 40 to 50% resin acids and the polymeric polyhydric alcohols used for esterifying the tall oil acids is resinous in nature; and these resinous alcohols appear to contribute to the flexibility as well as the hardness.

Tall oil is available as a cheap waste product or by-product of the paper pulp and when used with ordinary alcohols to form esters does not give valuable drying varnishes; but when esterified with the polymeric polyhydric alcohols according to the present invention excellent varnishes are obtained.

Tall oil is low in unsaturation and gives low bodied products when esterified with ordinary alcohols; but when esterified with the high molecular weight resinous polymeric polyhydric alcohols according to the present invention high bodied products can be obtained.

In addition, valuable composite products can be obtained in which the tall oil esters of the resinous high molecular weight polymeric polyhydric alcohols are combined with other esters.

The new synthetic drying compositions are made by the esterification with tall oil acids of high molecular weight resinous polyhydric alcohols and more particularly of high molecular weight polymeric polyether polyhydric alcohols which are polyether derivatives of polyhydric phenols having hydroxyl-containing aliphatic radicals united to the phenolic residues through ether linkages. Such high molecular weight polyhydric alcohols can readily be made of semisolid or solid consistency and of high molecular weight.

The high molecular weight resinous polyhydric alcohols which are subjected to esterification to produce the new esters, are advantageously prepared by the reaction of polyhydric phenols with polyhalo alcohols, epihalohydrins, or polyepoxide compounds to form complex reaction products containing several alcoholic hydroxyl groups per molecule. In certain cases the halohydrins or epoxy compounds used in making the polyhydric alcohols introduce epoxy groups as well as alcoholic hydroxyl groups into the high molecular weight product to give products which are hydroxy-epoxy products containing a plurality of alcoholic hydroxyl groups and one or more epoxy groups. For purposes of esterification epoxy groups when present act for the most part as glycol groups in reaction with organic acids, one epoxide group being in general equivalent to two alcoholic hydroxyl groups. The production of various high molecular weight polyhydric alcohols suitable for use in making the new drying compositions of the present invention is described in my prior applications Serial Nos. 502,317, filed September 14, 1943 now Patent No. 2,456,408, 535,342, filed May 12, 1944, 617,176 and 617,178, filed September 18, 1945, 626,449, filed November 2, 1945, and 621,856, filed October 11, 1945.

In my prior applications Serial Nos. 502,317, 535,342 and 617,178 I have described the preparation of polyhydric alcohols derived by the reaction of polyhydric phenols with polyhalohydrins, epihalohydrins, and polyepoxides both without and with the use of monofunctional reactants. By regulating the quantities and proportions of the reactants complex reaction products of predetermined molecular weights and predetermined hydroxyl contents can be obtained. Where chlorhydrins such as epichlorhydrin, glycerol dichlorhydrin or glycerol monochlorhydrin are used the reaction is carried out in the presence of caustic soda equal to or somewhat in excess of the amount required to combine with all of the halogen of the halohydrin. Such complex polyhydric compositions and particularly such compositions as are solid at ordinary temperature and those of much higher melting point are useful in the preparation of the new drying compositions of the present invention. With certain of the complex polyhydric compositions, it is advantageous to have at least five to fifteen esterifiable groups per molecule. This number of hydroxyl groups are especially advantageous when fast drying compositions are to be prepared. By at least five esterifiable groups is meant at least 5 hydroxyl groups in which one epoxide group is considered to be the equal of two hydroxyl groups. On the other hand, there are cases where complex polyhydric compositions of relatively high melting point, containing as low as two or three hydroxyl groups, may be esterified with tall oil acids to give compositions which may be dissolved in solvents to give valuable fast drying varnishes.

In my prior application Serial No. 617,176, filed September 18, 1945, I have further described complex reaction products of polyhydric phenols with polyfunctional halohydrins such as epichlorhydrin such as epichlorhydrin and glycerol dichlorhydrin with the difunctional chlorhydrin used in proportions in excess of that equivalent to the polyhydric phenol and less than twice the equivalent amount, with the addition of caustic alkali equal to or somewhat in excess of the amount required to combine with the halogen of the halohydrin and giving complex polymeric products containing both epoxy groups and hydroxyl groups. Such complex polymeric epoxy-hydroxy products and compositions are also advantageously used for reaction with tall oil acids to form the new drying compositions of the present invention. The complex epoxy-hydroxy compositions of my prior application Serial No. 621,856, filed October 11, 1945, can similarly be used.

In my companion application, Serial No. 626,449, filed November 2, 1945, I have described new polyepoxy products and compositions obtained by the direct addition of polyhydric phenols and polyepoxides, with the proportion of polyepoxides used in excess of the equivalent amount so that the resulting reaction products contain epoxy groups. Such polyepoxy reaction products and particularly those which are solids at room temperature are advantageously used in making the new drying compositions of the present invention.

The polyhydric alcohols used, regardless of the method of their production, are advantageously solids at ordinary temperature and in many cases products of much higher melting point are desirable. The polymeric polyhydric alcohols produced by the reaction of polyhydric phenols and polyfunctional aliphatic reactants such as polyhalohydrins, epihalohydrins and polyepoxides are complex reaction products but in general, and assuming a straight line reaction and polymerization, they contain alternating aromatic nuclei from the polyhydric phenol and aliphatic hyroxyl containing nuclei united through ether linkages. When an excess of polyhydric phenol is used some of the phenolic hydroxyl groups may be present in the final product, and products containing such terminal phenolic hydroxyl groups can be used for esterification. In general, however, I consider it more advantageous to use polymeric polyhydric alcohols which are free or relatively free from terminal phenolic hydroxyl groups and which contain instead either terminal non-reactive groups or terminal hydroxyl-containing or epoxy-containing groups.

In such polymeric products made from polyhydric phenols with polyfunctional halohydrins, epihalohydrins and polyepoxides there will in general be one or more alcoholic hydroxyl groups between the phenol residues and there may also be terminal alcoholic hydroxyl groups or epoxy groups.

High melting and high molecular weight products containing a lesser number of hydroxyl groups may be produced e. g., by using mixtures of dichlorhydrins or epichlorhydrins with dichlorides such as dichlordiethyl ether or dichlorbutene. Such dichlorides will give intermediate aliphatic groups between the phenolic residues which do not contain esterifiable hydroxyl groups while the residues formed from the dichlorhydrins or epichlorhydrins will contain esterifiable hydroxyl groups. Similarly products obtained by the reaction of polyhydric phenols with such dichlorides, using the polyhydric phenols in excess, and reacting the resulting complex polyhydric phenols with simple polyepoxides, will give high melting point products having a limited number of hydroxyl and epoxy groups.

The high molecular weight resinous polyhydric alcohols have alternating aliphatic chains and aromatic nuclei united through ether oxygen and are free from functional groups other than epoxy and hydroxyl groups.

The new synthetic drying compositions of the present invention are prepared by esterification of such high molecular weight polyhydric alcohols or epoxy-hydroxy compositions with tall oil acids either alone or admixed with other acids such as unsaturated vegetable oil acids.

Esterification of the complex high melting point polyhydric alcohols and epoxy-hydroxy compounds can conveniently be carried out by heating to elevated temperatures either with or without the addition of a catalyst and under conditions promoting the removal of water of reaction, e. g., by bubbling a slow stream of inert gas such as carbon dioxide through the reaction mixture while heated to elevated temperatures or by the use of a small amount of water insoluble solvent with the use of a suitable reflux condenser for removing the water.

The preparation of the new synthetic drying composition by the esterification of tall oil with the high molecular weight polyhydric alcohols and epoxy hydroxides will be illustrated by the following examples, but it will be understood that the invention is not limited thereto. The parts are by weight.

*Example I.*—The high molecular weight polyhydric alcohol used was made as follows: Into a 300 gallon open kettle, equipped with a mechanical agitator was weighed 866 lbs. of water, 392 lbs. of bis-phenol, 80 lbs. of caustic soda, and the resulting mixture was agitated until the bis-phenol had all dissolved in the aqueous alkali. The temperature at this stage was 40° C. To this solution was added 185 lbs. of epichlorhydrin and with continuous agitation the temperature was raised to 70° C. At this point 20 lbs. of caustic soda dissolved in 20 lbs. of water was added to the reaction mixture and the temperature was gradually raised to 93° C. and held at 93 to 100° C. for 1 hour. At the end of this reaction period the upper salt water layer was removed from the lower taffy like resin layer by decantation. About 65 gallons of boiling water was added and the resin mixture was agitated for 15 minutes and the water layer was again removed. The washing was repeated four times, adding enough acetic acid at the second wash to neutralize the water solution. After the final washing, the water containing resin was dried by heating until it reached a temperature of 150° C. to give a product which had a softening point of 114° C.

To 500 parts of this polyhydric alcohol was added 312 parts of crude tall oil containing about 45% resin acids. The reaction mixture was heated with continuous agitation and while bubbling carbon dioxide through the mixture for three hours at 250° C. to given an acid value below 1.

A 35% solution of this product, when treated with 0.05% cobalt naphthenate (based on the varnish solids) gave films of 0.003 inch which air dried to tack-free products in one hour.

*Example II.*—By a similar procedure as that used in preparing the polyhydric alcohol used in Example I a hydroxy-epoxide was prepared from four mols of bisphenol, 5 mols of epichlorhydrin and 6.3 mols of sodium hydroxide, the reaction going from 40 to 100° C. in 80 minutes and being kept at 100–104° for sixty minutes. The resulting resin after washing and drying had a softening point of 100° C.

To 200 parts of the hydroy-epoxy resin so produced was added 322 parts of a refined tall oil containing about 35% resin acids. The mixture was heated at 250° C. in accordance with the procedure of the preceding example until an acid value of 12 was obtained.

A 50% solution of this product in mineral spirits had a viscosity of D. When treated with driers this product gave films which air dried in 24 hours to a hard, flexible product.

*Example III.*—By the same procedure as that used in preparing the polyhydric alcohol used in Example I, a polyhydric alcohol was prepared by the reaction of 20 mols of bisphenol with 15.5 mols of epichlorhydrin and 9 mols of glycerol monochlorhydrin in the presence of 24.54 mols of sodium hydroxide and had a softening point of 116° C.

In a vessel provided with a mechanical agitator and with a reflux condenser of the Bidwell-Sterling type was placed 183 parts of the polyhydric alcohol and 315 parts of crude tall oil. A sufficient amount of mineral spirits was added to give refluxing when heated at 250° C. This reaction mixture was heated with continuous agitation for one hour at 250° C., two hours at 260° C. and held at 270° C. until the acid value had reached 8.5.

To the resulting product was added 0.05% cobalt drier and an equal weight of hydrocarbon solvent and 0.003 inch films were spread. These films baked for 30 minutes at 150 C., or air-dried overnight, gave a hard, flexible film.

It is sometimes desirable to increase the ratio of long chain acid esters to resin esters present in the new tall oil compositions, especially where crude tall oil containing 40–50% resin acids are used. This may be advantageously done by using unsaturated acids or their esters in connection with tall oil, as illustrated by the following examples.

*Example IV.*—In a vessel provided with a mechanical agitator and a condenser of the Bidwell-Sterling type was placed 280 parts of the same polyhydric alcohol referred to in Example I and 315 parts of crude tall oil. Sufficient mineral spirits was added to give refluxing when heated at 270° C. The reaction mixture was heated with continuous agitation and at 270° C. for about six hours and 40 minutes to give a product with an acid value of 7.8. After cooling the mixture to 200° C. 505 parts of R bodied linseed oil were added and the resulting mixture heated with agitation for 45 minutes at 250° C.

The resulting product when dissolved in hydrocarbon solvents and treated with driers gave excellent varnishes.

*Example V.*—In an apparatus such as referred to in the preceding example were placed 280 parts of the same polyhydric alcohol used in Example I, 236 parts of crude tall oil, and 63 parts of linseed oil acids. Sufficient mineral spirits was added to give refluxing at 250° C. and the reaction mixture was heated at that temperature for 12½ hours to give a product with an acid value of 10.

A 50% solution of the product in mineral spirits had a viscosity of Z–2 and when treated with driers gave an excellent varnish.

*Example VI.*—A mixture of 280 parts of the same polyhydric alcohol used in Example I, 157.5 parts of crude tall oil and 126 parts of linseed oil acids were heated to effect esterification in accordance with the procedure described in the preceding example with heating at 250° C. until an acid value of 6.5 was obtained.

A 50% solution of the resulting product in mineral spirits had a viscosity of Z–3 and with driers gave an excellent varnish.

The high molecular weight polyhydric alcohols of the above examples are of the type containing at least five esterifiable groups per molecule and within the range of 5 to 15 esterifiable groups per molecule, such esterifiable groups including hydroxyl groups and epoxide groups (one epoxide being the equal of two hydroxyl groups). Such polyhydric alcohols are esterified with an average of at least five ester groups per molecule of polyhydric alcohol.

In the above examples the proportions of high molecular weight polymeric polyhydric alcohol esterified to tall oil acids used for esterification varies from about 1.8 to 1 to about 1 to 1.7 by weight. In Examples I to III in which the tall oils are used alone with the high molecular weight resinous alcohols the proportions vary from about 1.6 to 1 to about 1 to 1.7. In Examples V and VI the proportion of resinous alcohol to tall oil is from about 1.2 to 1 to about 1.8 to 1 and the proportion of drying oil acids is from about 22% the weight of the resin to about 44% the weight of the resin.

Other resinous polymeric polyhydric alcohols such as described in said prior applications can similarly be used and esterified with tall oil acids to give new drying compositions. Thus, polymeric polyhydric alcohols containing a number of intermediate hydroxyl groups and which do not contain terminal hydroxyl groups can be esterified; as well as polymeric polyhydric alcohols which contain terminal hydroxyl groups or terminal epoxide groups or both terminal hydroxyl and epoxide groups, as described in said prior applications.

The present invention provides improved tall oil esters which are valuable drying varnish compositions even from tall oil acids of relatively low unsaturation. The presence of a number of hydroxyl groups in the polymeric polyhydric alcohols enables an increased number of ester groups to be united to a single alcohol molecule and enables improved drying varnishes to be obtained even from tall oil acids of relatively low unsaturation. The resinous nature of the high molecular weight polymeric polyhydric alcohols, including polymeric alcohols which are hydroxy epoxides, appears to play an important part in giving to the new drying ester compositions their valuable drying and other properties, such as those previously referred to.

I claim:

1. A synthetic drying composition consisting essentially of tall oil esters of a high molecular weight resinous polymeric polyhydric alcohol having an average of more than five esterifiable groups per molecule, said resinous polymeric polyhydric alcohol being a polyether derivative of a dihydric phenol having alternating aliphatic chains and aromatic nuclei united through ether oxygen and being free from functional groups other than epoxy and hydroxyl groups, the proportions of tall oil combined with the high molecular weight polymeric polyhydric alcohols being from about 1.7 to 1 to about 1 to 1.8 by weight.

2. A synthetic drying composition as defined in claim 1, in which the resinous polymeric polyhydric alcohol is also esterified with from about 22 per cent to 44 per cent its weight of vegetable drying oil acids.

3. A synthetic drying composition as defined in claim 1, in which said dihydric phenol is 4,4'-dihydroxydiphenyl-2,2-propane and in which said aliphatic chains are derived from epichlorohydrin.

4. A synthetic drying composition as defined in claim 1, in which the resinous polymeric polyhydric alcohol is also esterified with from about 22% to 44% its weight of vegetable drying oil acids, in which said dihydric phenol is 4,4'-dihydroxydiphenyl-2,2-propane and in which said aliphatic chains are derived from epichlorohydrin.

SYLVAN OWEN GREENLEE.

REFERENCES CITED

The following references are of record in the file of this patent:

UNITED STATES PATENTS

| Number | Name | Date |
|---|---|---|
| 2,060,715 | Arvin | Nov. 10, 1936 |
| 2,197,813 | Strauss | Apr. 23, 1940 |
| 2,213,477 | Steindorff et al. | Sept. 3, 1940 |
| 2,324,483 | Castan | July 20, 1943 |

FOREIGN PATENTS

| Number | Country | Date |
|---|---|---|
| 115,753 | Australia | Mar. 4, 1943 |
| 470,181 | Great Britain | Aug. 3, 1937 |
| 576,177 | Germany | May 8, 1933 |

OTHER REFERENCES

Paint, Oil and Chemical Review, Nov. 2, 1944 (pages 84–86).